Figure 2:
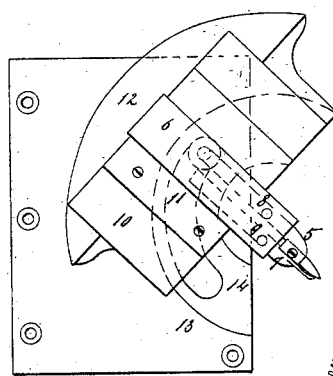

Sheet 1-3 Sheets.

C. W. Dickinson,
Rose Engine,

Nº 45,455.      Patented Dec. 13, 1864.

Witnesses:
John E. Hughes
James T. Graham

Inventor:
C. W. Dickinson
By Thos. P. How
Atty

C. W. Dickinson
Rose Engine
Nº 45,455. Patented Dec. 13, 1864.

Witnesses
John L. Hughes
James T. Graham

Inventor
C. W. Dickinson
By Thos. J. How
Atty

Sheet 3-3 Sheets.
C. W. Dickinson,
Rose Engine,
Nº 45,455. Patented Dec. 13, 1864.
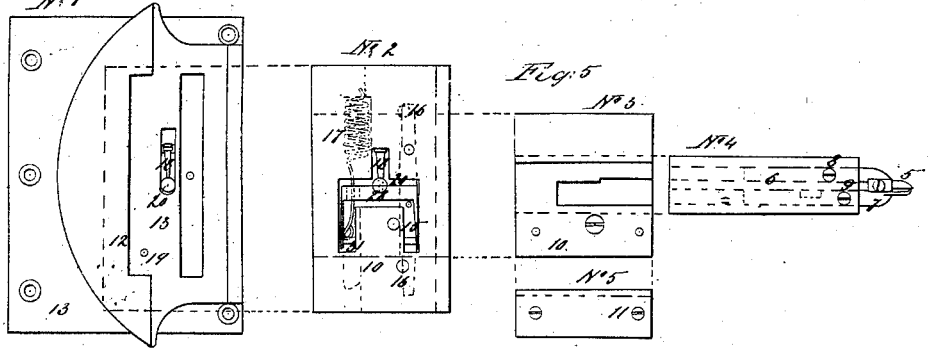
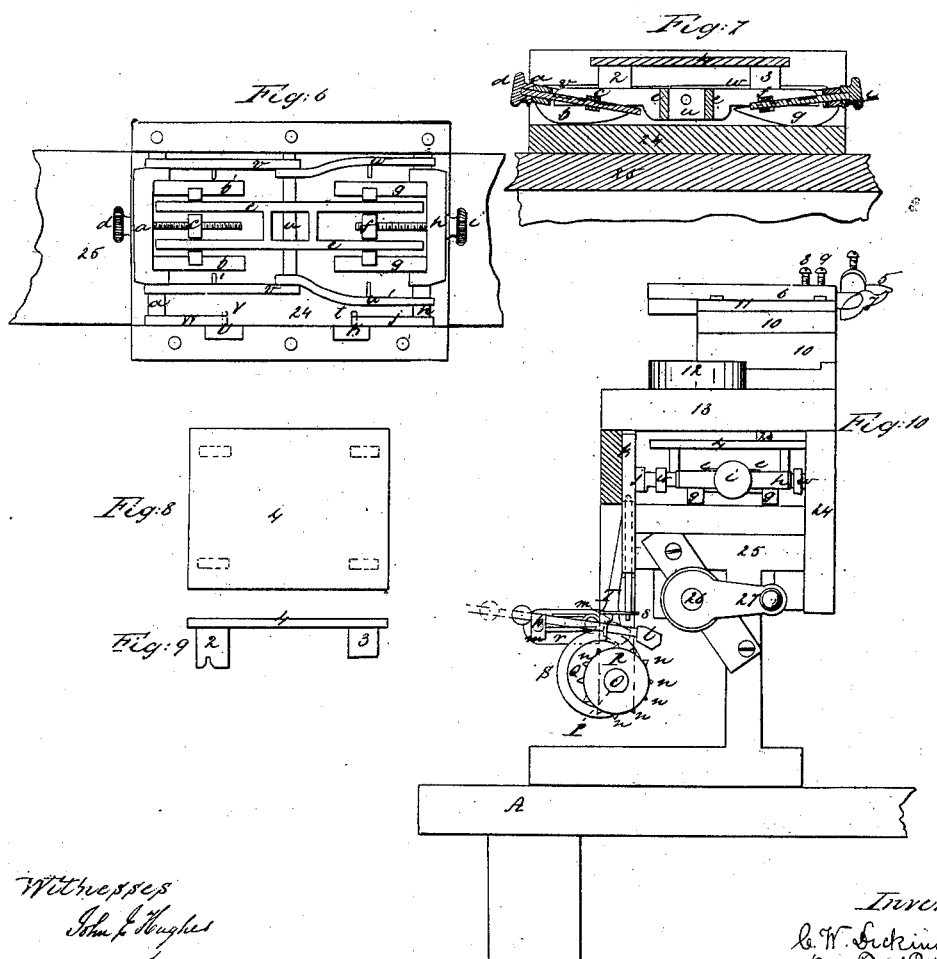

UNITED STATES PATENT OFFICE.

CHARLES W. DICKINSON, OF NEWARK, NEW JERSEY, ASSIGNOR TO HIMSELF AND GEORGE ROWDEN, OF SAME PLACE.

IMPROVED ENGINE TURNING LATHE.

Specification forming part of Letters Patent No. 45,455, dated December 13, 1864.

*To all whom it may concern:*

Be it known that I, CHARLES W. DICKINSON, of Newark, in the county of Essex and State of New Jersey, have invented certain Improvements in Engine Turning-Lathes; and I do hereby declare that the following is a full, clear, and exact description thereof, reference being had to the accompanying drawings, making part of this specification.

My lathe is designed to be used for the purposes of engraving and of ornamenting jewelry, silver-ware, &c., and may also be used for engraving dies, for stamping work, for enameling, and for other purposes. It is designed to take the place of the machine known as the "Rose Engine-Lathe," by which these styles of work are usually performed, but which is subject to several disadvantages, one of the most prominent of which is that as the main shaft and its rosettes or patterns with the work to be engraved must all vibrate bodily to wave the line, and the aggregated weight of these being very considerable, their consequent great inertia renders it impracticable to run the lathe at anything more than a very low speed. The vibration of the work or object to be ornamented also renders it difficult to keep the compound eccentric and tilt-chuck in complete adjustment, owing to the strain and wear caused by the constant vibration of these heavy parts when the lathe is in motion. These defects make themselves readily apparent in the quality of the work. This fact will be the more obvious when we consider that the work is exact in its nature, and that a very small deviation from absolute accuracy must therefore, from the nature of the case, make a very easily perceptible difference in the finished engraving.

Another important difficulty in the use of the rose lathe for some kinds of work arises from its incapacity to execute the proper vibrations parallel to the surface of the work, when said surface is at an angle between a line parallel with the mandrel of the lathe and another line at right angles thereto. In all such cases the vibration of the work to produce the waved line necessarily causes it to approach and recede from the rest which supports the cutting-tool, and as the vibration of the work must necessarily be either in a line parallel to the mandrel or at right-angles to it, this motion to and from the rest is necessarily at some angles very considerable, and involves a corresponding advance and withdrawal of the tool at each vibration. It is obvious that this state of things must necessarily to a certain extent be destructive to the harmony of the design, not only on account of the imperfections resulting from the alternate advance and withdrawal of the tool, but also in consequence of the fact that the angularity of the surface of the work to the line of motion causes the wave to vary considerably in its form and extent from what it would be were the same motion applied upon a surface parallel to the line of motion. This difficulty is particularly experienced in engraving watchcases while working out over the turn near the periphery.

The difficulties above named are increased by the additional one of making the divisions of the rosettes of the exact form necessary to give the best effect, and by the still greater one of preserving them in that form, when made, against the abrasion unavoidably resulting from the vibration of so great a weight upon them. The rose-lathe is also inconvenient in the matter of changing from one figure to another.

My machine is also designed to do a large portion of those kinds of work which are now done on the machine known as the "geometrical lathe" for bank-note work and other purposes. For several of the purposes for which the latter-named machine is used my machine possesses the advantages of greater facility of adaptation and the capability of greater speed of operation.

In my machine all the motions, except the simple ones of either rotation or rectilinear motion given to the work, are made by the tool instead of by the mandrel or slide. In most of the lathes now in use for the purposes for which mine is intended the figures are made up by the motions of the mandrel or slide, no motion of the tool having been devised previous to my invention which was of sufficiently universal adaptation to the general and multifarious purposes to which such machines are applied to justify its extended embodyment in lathes of this kind.

My invention consists in, first, the combination of cams or projections on a revolving pattern with a vibrating frame capable of adjustment, so as to modify the action or effect of the cams upn the work, and a tool-plate or device for holding the engraving-tool, as hereinafter more fully set forth; second, the combination of a revolving eccentric, a vibrating frame made adjustable to vary or modify the action of said eccentric upon the work, and a shaft on which the said eccentric is allowed to be moved longitudinally, substantially as and for the purpose hereinafter more fully set forth; third, the combination of an eccentric and one or more cams or rosettes with each other and with other parts which connect them to the engraving-tool in such a manner that the motions produced by both are combined and transmitted to the engraving tool, substantially as hereinafter more fully set forth; fourth, the combination, with an engraving-tool and a guide or follower by which its depth is regulated, of an eccentric and connecting parts in such a manner that the engraving-tool will be withdrawn periodically from the surface of the plate or other work to be engraved by the action of the mechanism, as hereinafter more fully set forth; fifth, the combination, with an engraving-tool and a guide or follower by which its depth is regulated, of one or more cams or rosettes and connecting parts in such a manner that the engraving-tool will or may be withdrawn, from time to time, from the surface of the work to vary the figures by the action of the cams or rosettes, as hereinafter more fully set forth; sixth, the combination, with a series of cams or rosettes, and with a reciprocating frame, from which motion is transmitted to the engraving-tool, of a series of adjustable stops or touches, by the adjustment of which any one or more of the cams or rosettes may be made to operate upon the engraving-tool, as hereinafter more fully set forth; seventh, the arrangement, with one of the shafts, by which that part of the machine which moves the work to be operated upon is connected with that part of the machine which operates the engraving-tool, of a doubling-clutch so constructed as to allow the figure to be readily doubled, substantially as and the purpose set forth; eighth, the arrangement, with an engraving-tool and parts for communicating motion thereto, of a platform or bridge and two or more supporting parts for supporting the same, and one or more cams or rosettes or eccentrics, or equivalent devices for operating each of the same, substantially as set forth; ninth, the combination, with a frame or equivalent device for supporting the bridge or platform by which or in which the several motions of two or more different cams, rosettes, or eccentrics, one or more or either are combined, of one or more adjustable bearings, by which the effect of one or more of the motions combined upon the motion of the engraving-tool may be more or less modified, as hereinafter more fully set forth; tenth, so constructing any one or more of the adjustable bearings above mentioned, and so combining it with other parts, that one of the several motions combined in the action of the engraving tool may be made inoperative upon the graver, substantially as and for the purpose hereinafter set forth.

Figure 3:
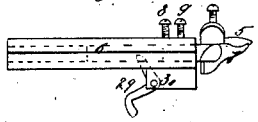
Figure 1:
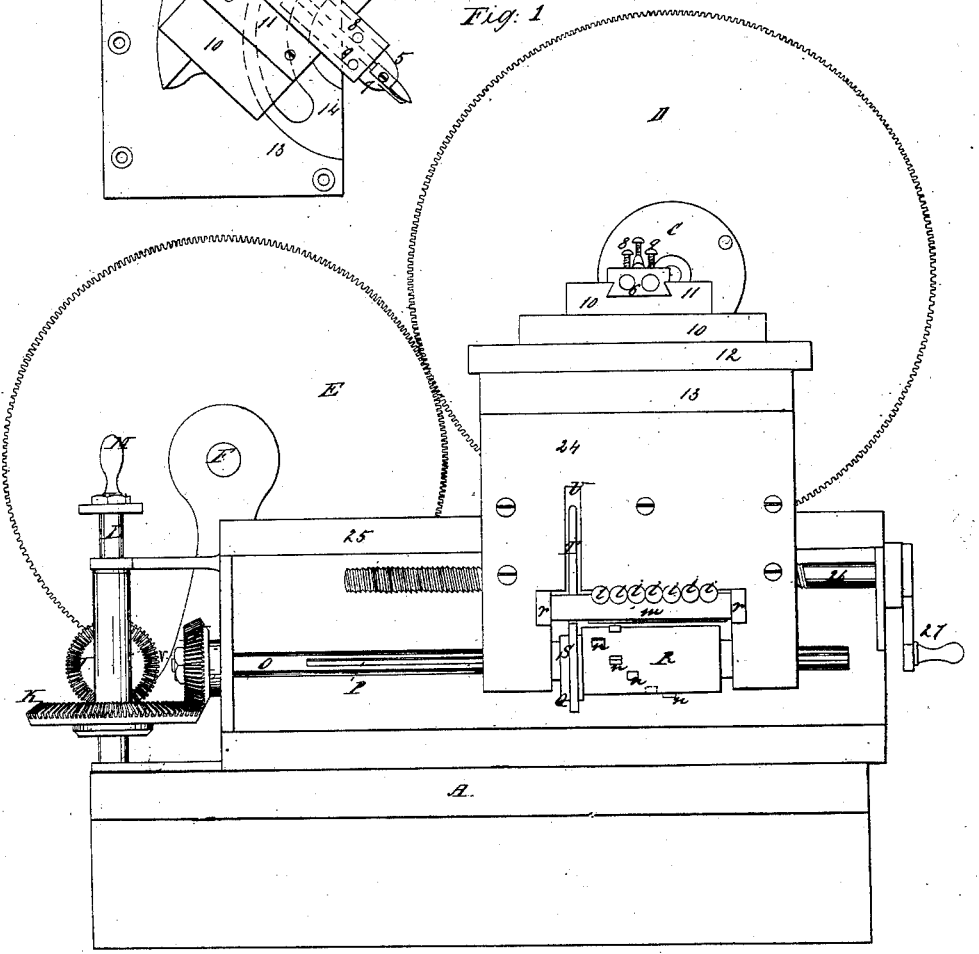
Figure 4:
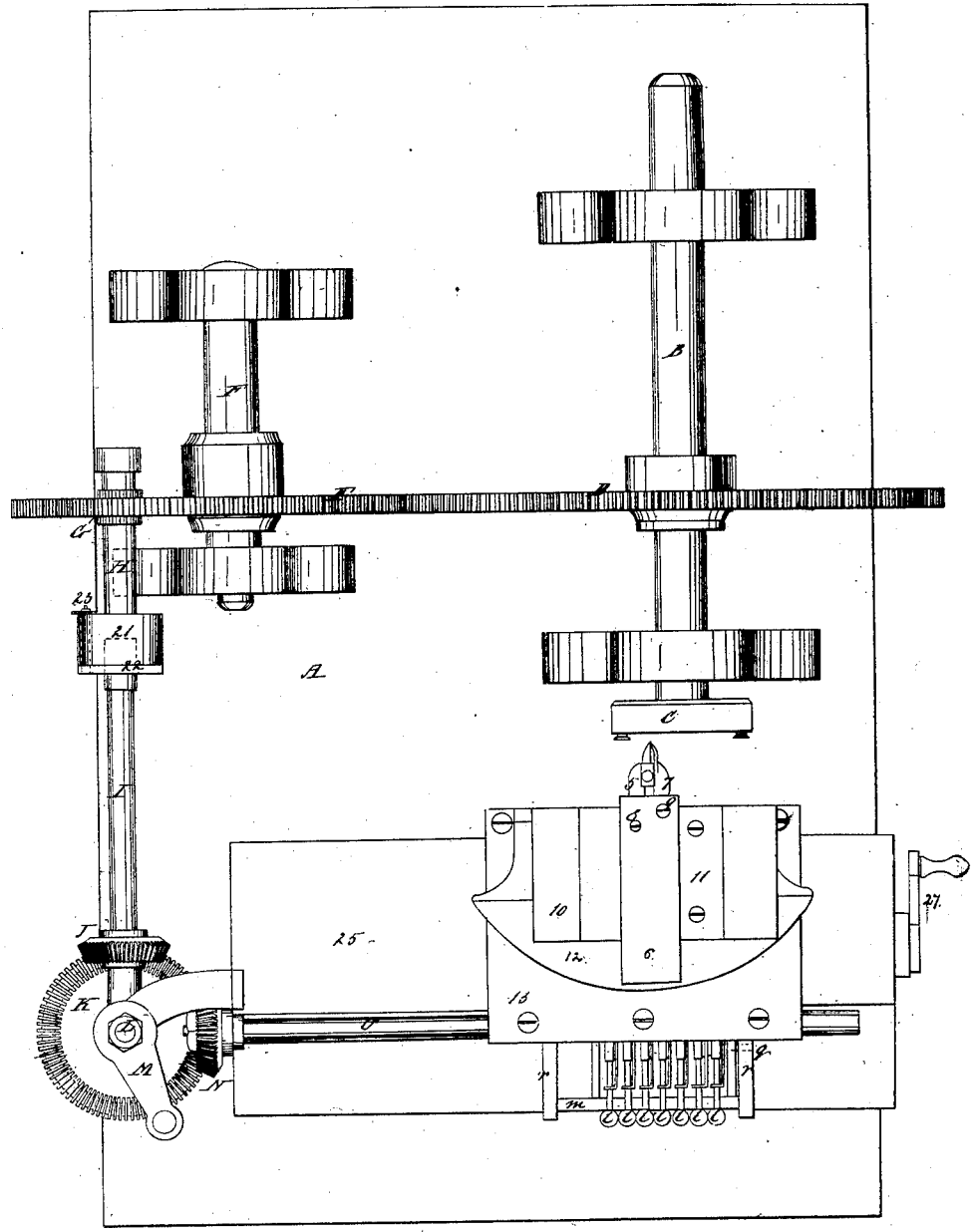

In the accompanying drawings, Figure 1 is an end elevation of my improved lathe. Fig. 2 is a plan of the engraving-tool and rest, showing the tool in position to operate upon an angular surface. Fig. 3 is a detail view showing in side elevation the sliding tool-holder, the engraving-tool, the gage or guide by which the depth of the operation of the engraving-tool is regulated, and the arm or bell-crank, which is used in connection with other parts for retracting or withdrawing the engraving-tool from the work. Fig. 4 is a general plan of the machine. Fig. 5 gives detailed views of the tool-slide and of the several upper works upon which it is mounted. In this figure No. 1 is a revolving table arranged to turn upon the main slide placed under it, so as to give the tool a motion parallel with the surface of the work; No. 2 is a plate which is mounted immediately upon the plate represented in No. 1; Nos. 3 and 5 represent parts of the cap or plate which supports the sliding tool-holder or rest, and No. 4 represents the tool holder. Fig. 6 is a plan of some of the internal mechanism of the rest by which the motion given by the cams or rosettes and eccentric is communicated to the engraving-tool. Fig. 7 is a section of the same parts. Fig. 8 is a plan of a table by which the motion from the eccentric and rosettes or cams is communicated to the engraving-tool. Fig. 9 is a side view of the same thing. Fig. 10 is a detail elevation showing an end view of the rest upon which the engraving-tool is mounted, and also showing the connection of various parts for transmitting the motion of the rosettes and eccentric to the engraving-tool.

A is the ped-plate of the machine, which should be made of cast-iron, though in the drawings it is represented as being made of wood. It is proper to remark here that none of the parts of this machine should be made of wood, and that all the parts which are represented in the drawings as wood should be made of iron, steel, or brass.

B is the mandrel of the lathe. It is mounted in bearings in the usual manner, is provided with a face-plate, C, on which to place the work, and carries a spur-wheel, D, which gears into another spur-wheel, E, on the shaft F. The wheel E gears into a pinion, G, on the clutch-shaft H, which latter is mounted on the shaft I. The shaft I carries a bevel-wheel, J, which meshes into another bevel-wheel, K, on the shaft L, to which latter the crank M is attached. The machine is put in motion by turning this crank M, and from this point it is easy to trace the motion through the connections already described to the mandrel B. The bevel-wheel K also meshes into a bevel-wheel, N, by which means motion is communicated to the shaft O, on which the wheel N is hung. This shaft O has a groove, P, running nearly its entire length, as shown in Fig. 1, to receive a corresponding rib, which projects inwardly from the piece or cylinder upon which the eccentric and rosettes are formed, as shown in Fig. 10.

Q is an eccentric which is accurately fitted on the shaft O, and has a rib projecting inwardly therefrom to fit into the groove P in the shaft O.

R is a piece of metal on which a series of cams or rosettes are formed to aid in the production of the pattern desired. These rosettes may be formed separately; but I prefer to make them all in one piece. The eccentric Q and the rosettes R form the pattern engraved by giving motion to the engraving-tool.

S is an eccentric-strap, which surrounds the eccentric Q, and by means of the rod T connects it with the slide U. This slide has a pin, V, inserted in it, which supports and operates upon the lifter W, communicating to it a vertical motion derived from the revolution of the eccentric Q. This lifter W is made in one piece with shaft $a$ and the arms $b$. These last support a cross-head, $c$, which is adjusted thereon by means of a thumb-screw, $d$, the object of this adjustment being to vary the effect of the eccentric upon the motion of the tool. This cross-head or cross-bar $c$ supports one end of the frame $e$, the other end of which is supported by the similar cross-head $f$. This cross-head $f$ is supported on arms $g$, of similar construction to the arms $b$, and formed in like manner in one piece with the shaft $h$. It is also similarly adjusted by means of the thumb-screw $i$. A lifter, $j$, similar to the lifter W, projects from the shaft $h$, and is operated by the slide $k$, which latter receives motion from the cams or rosettes formed upon the cylinder R through the intervention of the stops or touches $l$. These stops or touches $l$ are all hung in a vibrating frame, $m$, in such a manner as to be readily adjustable by drawing them outward or pushing them inward. When they are pushed into the position represented in the drawings, they are not operated upon by the cams or rosettes; but when they are drawn out, as represented or indicated in red lines in Fig. 10, the cams or rosettes $n$ on the cylinder R act upon them at each revolution of said cylinder, by this means periodically raising the inner side of the frame $m$ and giving it a vibrating motion on its axis, $p$, the inner end of this frame being prevented from falling too far by the pin $q$, set in one of the hangers $r$, in which the frame $m$ is supported. The motion thus produced is communicated to the slide $k$ by means of a projecting piece, $s$, which extends under a shoulder on the said slide. The motion thus communicated to this slide is in its turn imparted to the lifter $j$ by means of the pin $t$ and through said lifter and the frame of which it forms a part to the frame $e$, in the manner already described in relation to the communication of the motion of the eccentric to the other end of the said frame. A shaft, $u$, extends transversely through the middle of the frame $e$, which shaft supports one end of each of the bars $v$ and $w$, the other end of the bars $v$ being supported by the shaft $a$, and the other end of the bars $w$ being supported by the shaft $h$, on each of which bearings they are permitted to vibrate. A pin, 1, is fixed in each of these levers or bars $v$ and $w$ for the downwardly-projecting lugs 2 and 3 of the platform 4 to rest on. These pins I place at the same relative distance between the fixed and movable bearing in all these bars. The lugs 2, as will be perceived, are notched, as represented in Fig. 9, to prevent the platform from getting out of its place upon the pins.

It will be observed by a careful consideration of the foregoing description that every motion given to frame—that is to say, every elevation or depression given to either end of it—has its proportionate effect upon the platform through the shaft $u$ and the levers $v$ and $w$, and only in that way; and this being considered, it is easy to see that when the pins 1 are all placed at the same proportion of the distance from the fixed to the movable bearing in each lever $v$ and $w$, all parts of the platform 4 will be raised and lowered alike, notwithstanding this motion may be produced either by a movement of one end alone of the frame $e$ or by the combined movements of both ends. This is very important, as it not only insures the uniform action of the engraving-tool without reference to its position over the platform, but also because it allows the motions of the cams and the eccentric to be combined and modified to any desired extent, as will be hereinafter more fully explained.

It now becomes necessary to trace to the engraving-tool the motions imparted, as already described, to the platform 4, and as the mechanism by which this result is secured is somewhat complex, I shall be obliged to ask the reader's careful and undivided attention.

5 is the tool by which the engraving is done. It is secured in a sliding stock, 6, and a gage, 7, is also fitted and secured in the same stock. Both the tool 5 and the gage 7 are so fitted into holes or grooves in the stock as to be capable of longitudinal or sliding motion therein when not prevented by the set-screws 8 and 9, for a purpose which will be hereinafter explained. The tool-stock 6 is also fitted to slide freely in a dovetail groove in the tool-plate 10, in which it is mounted, and may be kept up to the work by the pressure of the hand or by a spring, as may be desired. For the purpose of accurate adjustment of the width of the groove to the width of the tool-stock, one side of it is formed by the separate plate 11, as shown in No. 5, Fig. 5. The tool-plate 10 is mounted on the swing-plate 12 in such a manner as to allow it to slide smoothly and with tolerable ease for a short distance in a horizontal direction transverse to the line of motion in which the tool-stock 6 slides in the tool-plate 10. The swing-plate 12 is mounted upon the plate 13, which forms a part of the sliding carriage in which the vibrating frame e and other parts are secured. A circular groove, 14, is formed in the plate 13, as shown in Fig. 2, into which a corresponding tongue, projecting downward from the swing-plate 12 fits, so as to allow the swing plate to be turned round within certain limits to allow slide-plate or tool-plate 10 to slide parallel with the surface of the work at the operating point, and the tool slide or stock 6 to slide at right angles to it. The center of motion, or rather the center upon or partially around which the swing-plate 12 turns, is designed to be at the working-point of the engraving tool, or as nearly so as possible. A more perfect adjustment in this particular may, if necessary, be secured by mounting the swing-plate upon an auxiliary plate, the latter being so mounted upon the plate 13 in such a manner as to be capable of being adjusted and fixed in any position upon it. The sliding plate or tool-plate 10 is prevented from tipping on the swing-plate 12 by means of a bar, 15, the ends of which are permitted to slide in hooks 16, attached to the tool-plate, as shown in dotted lines in No. 2, Fig. 5, and the middle of which is secured by a screw to the swing-plate, thereby keeping the plate 10 down snugly to the plate 12. Any one of various other devices well known to mechanics for similar purposes may, however, be used. The swing-plate 12 is also secured from tipping on the plate 13. The position and motions of the tool-plate 10 upon the swing-plate 12 are secured and controlled through the intervention of a spring, 17, shown in No. 2, Fig. 5, partly in dotted lines, and a bent lever or bell-crank, 18, shown in the same figure. One end of this spring 17 is secured to the tool-plate 10, and the other end is hooked onto a stud, 19, set in the swing-plate, by which arrangement the tension of the spring 17 is made to draw the tool-plate 10 to the right on the swing-plate 12. The bell-crank 18 is hung in the swing-plate 12, with one arm projecting upward and resting against a shoulder upon the tool-plate 10 in such a manner as to hold or press it back against the tension of the spring 17. The other end of this bell-crank 18 rests in a mortise in the lifting-rod 20, the lower end of which rests upon the platform 4, a mortise of annular form being cut through the plate 13 to allow it to extend through, at the same time allowing its position to be changed by the swing of the plate 12. The parts being thus constructed and arranged, we can now perceive that the tension of the spring 17 will draw the tool-plate 10 to the right hand upon the swing-plate 12 till the lifting-rod 20 is pressed down snugly upon the platform 4, the horizontal arm of the bell-crank 18 resting in the bottom of the mortise made through said lifting-rod for its reception. This being the case, it is clear that any elevation or lifting of the platform 4 will move the tool-plate 10, and with it the tool-slide and engraving tool horizontally to the right, and any depression of the said platform will allow the spring 17 to draw said tool-slide and tool to the left. It will therefore be easy to see, from a careful examination of the foregoing description of the mechanism and the movements thereof, that the movements imparted to the engraving-tool during the rotation of the face-plate C, upon which the article to be engraved is mounted, can be made to produce a waved line upon the work. This line may, however, be varied from a true and plain circle to a very eccentric or a very sharply waved line, or both, by adjustments of the parts. By drawing back the cross-bar c till it coincides with the center of the shaft a the effect of the eccentric Q upon the engraving-tool is reduced to nothing; and unless some of the cams or rosettes are made to affect the operation of said tool, the line traced by it will be a true circle; but by means of the adjusting-screw d the bar c may be adjusted to any position between this nugatory position and the end of the screw, at which latter position it would give the eccentric the greatest effect, and produce the greatest eccentricity of the line made by the engraving-tool upon the work. A similar capacity for adjustment exists at the other end of the frame e, which is operated by the cams and rosettes, so that their effect may be varied anywhere from a perfectly plain line to a very sharply waved one.

By modifying the operations of the eccentric and cams by means of the adjusting-screws d and i, very greatly varied and extremely beautiful effects may be produced, and by combining the varied effects of both the range of variation is very much enlarged. Still greater range, if ever desired, may be produced by making the frame e triangular, and supporting and operating it at three points instead of two, the supports to the platform being constructed to conform to such an arrangement, and the frame e being operated at one point by one series of cams or rosettes, at another point by another series of perhaps different form, and at the third point by an eccentric. The present arrangement, however, including the provision already described, by which the individual cams or rosettes can be each thrown into or out of operation at pleasure, is believed to give sufficient variety and range for most practical purposes when operated in connection with the doubling-clutch already mentioned, and which will be hereinafter bescribed.

It is proper to remark here, to avoid being misunderstood, that the eccentricity spoken of as effected by the action of the eccentric on the engraving-tool is not intended to indicate that the line thus produced will be a plain circle with different center from that of the mandrel of the lathe—it (a waved line) produced by an eccentric motion acting in a direct line upon the engraving-tool, as will be seen by a careful consideration of the action of the parts in connection with each other.

In some of the kinds of work which this machine is intended to perform it is sometimes desirable to "double" the figure. To accomplish this in this machine I make an enlargement, 21, on the end of the clutch-shaft H, which enlargement forms one part of a pin-clutch and meets a corresponding enlargement, 22, on the shaft I. Two holes are bored through these two enlarged portions 21 and 22 on opposite sides of the shaft, and the two parts 21 and 22 are connected by a pin, 23, passing through both, and by withdrawing pin from the part 22, turning it around till the pin meets the hole in the opposite side, and inserting the pin, the movements of the engraving-tool are shifted upon the work so as to double the figure, or, in other words, so as to bring the outer portion of the wave produced by the eccentric, or by any one of the cams, opposite to the inner portion thereof in the preceding line. In doing this kind of engraving it is necessary to move the tool along upon the work at the end of each revolution. To accomplish this in this machine the frame 24, which supports all the connections between the shaft O and the engraving-tool, is fitted to slide upon the plate 25, which latter is extended down by a web and flange to the bed plate of the machine and bolted thereon, the frame 24 being adjusted and moved along as the work requires by the screw 26, worked by the crank 27, said screw working in a nut attached to the frame 24. Said frame, as it is moved along on the plate 25, carries with it the eccentric Q and the cam or rosette cylinder R, these parts sliding upon the shaft as already intimated, so that all the parts which give motion to the engraving-tool preserve their proper relative positions. The screw 26 is usually worked by hand at the end of each revolution to move the engraving-tool along the proper distance for the next cut, and for fine work should be provided with an index with graduated index-plate stationarily fixed behind it to insure the perfect adjustment of the tool. It might, perhaps, on some kinds of work be operated automatically.

Another device in this machine is so constructed and combined with other parts as to raise, or rather withdraw, the engraving-tool periodically from the work, by which what may be termed "raised figures" may be produced. For this purpose the lifting-rod 20 is extended up so far as to support the frame or link 28 when in its lowest position. It is obvious that it will consequently raise that part of the link which rests upon it as often as it is itself raised by the platform 4. The shank of the gage 7, which enters the tool-stock 6, is mortised to receive the vertical arm of a bell crank, 29, which is hung upon an axis, 30, in a downwardly-projecting portion of the tool-stock. The horizontal end of this bell-crank 29 rests, when adjusted to operate, upon the bar or link 28, which rests upon the lifting-rod 20, and is hung upon an axis of vibration at 31. When the use of this apparatus for withdrawing the tool from the work is not desired, the gage 7 is pushed far enough forward in the tool-stock 6 to raise the horizontal arm of the bell-crank 29 out of the range of the link 28, at its highest point of elevation, and fastened in that position by the set-screw 9, the engraving-tool being advanced sufficiently beyond it to give the proper depth of cut and secured in that position by the set-screw 8; but when it is desired to use this withdrawing apparatus the set-screw 9 is started back so as to allow the gage 7 to slide freely in the stock 6; the gage 7 is started back till the horizontal arm of the bell-crank 29 rests upon the link 28, when in its lowest position, and the engraving-tool is drawn in till it is only sufficiently in advance of the gage in its new position to give the proper cut, and is secured there by means of the set-screw 8. It will be obvious from a consideration of these new adjustments and the necessary operation of the parts that so long as platform 4 remains in its lowest position the engraving-tool will operate upon the work in the same manner as before; but when the platform 4, and consequently the link 28, is raised as the gage, being already pressed against the work, cannot advance, the tool-slide 6 is necessarily drawn back, which brings the engraving-tool behind the point of the gage and out of working range, and as the platform again descends the pressure upon or against the tool-stock causes the engraving-tool to resume its original working position. By stopping off all the rosettes and running back the bar $c$ very nearly to the axis $a$, so as to give a very close adjustment to the eccentric motion, this feature of the machine may be made to produce a very slightly waved line of variable and graduated depth, the effect of which is highly ornamental. By fastening the tool-plate or slide 10 so far to the left as to be out of the range of the vertical arm of the bell-crank 18, the engraving-tool may be withdrawn from the work by the apparatus above described without waving the line at all.

A slide may be substituted for the mandrel B and the face-plate $c$ when the character of the work to be performed requires it. The slide should in this case be worked with a uniform, direct, rectilinear motion.

A careful examination of the foregoing description will show that the parts vibrated to wave or break the line being very light, the machine may be run at a very high speed without difficulty, and also that the facility with which the eccentric and the various rosettes may be combined and their motions modified provides the means for the introduction of a vast variety of figures, and that, too, upon the same piece of work, if desired, without any necessity for breaking up the general harmony of the parts. By modifications in the forms and combinations of the rosettes used the variety of work performed may be increased almost to an unlimited extent, and a large portion of the work done heretofore on the geometric lathe can be performed with advantage on this machine.

I claim the following improvements in engine turning-lathes:

1. The combination of the sliding cams $n$, adjustable frame $e$, and tool-plate 10, substantially as and for the purpose set forth.

2. The combination of the eccentric Q, the adjustable frame $e$, and the shaft O, substantially as hereinabove set forth.

3. The combination of the eccentric Q, one or more of the cams, $n$, or their equivalent, and the vibrating frame $e$ and connecting parts, or equivalent device, for combining the motions produced by the eccentric and the cams and transmitting the same to the engraving-tool.

4. The combination of the engraving-tool 5, the gage 7, the bell-crank 29, or its equivalent, and the eccentric Q, substantially as and for the purpose hereinbefore stated.

5. The combination of the engraving-tool 5, the gage 7, the bell-crank 29, or its equivalent, and one or more of the cams, $n$, connected as described, or in manner equivalent, substantially as and for the purpose set forth.

6. The combination of the cams, $n$, or any two or more of them, the adjustable stocks or touches $l$, or any two or more of them and the slide $k$, when the latter is connected to the engraving-tool, substantially as described, to the effect hereinabove stated.

7. The arrangement, with the connecting-shafts H and I, or equivalent, and with the engraving-tool and the face-plate or its equivalent, on which the work is to be mounted, of the doubling-clutch 21, 22, and 23, substantially as and for the purpose set forth.

8. The arrangement in the engraving-tool 5, platform 4, eccentric Q, and cams $n$, or equivalent device, the parts being connected substantially as and to the effect stated above.

9. The combination of the frame $e$, the platform 4, one or more of the adjustable bearings, $c$ and $f$, and one or more of the vibrating arms, $b$ and $g$, or equivalent, for modifying the motions to be imparted to the engraving-tool, substantially as set forth.

10. So constructing the adjustable bearings $c$ and $f$, or either of them, and so combining therewith the frame $e$ and the armed shafts $a$ and $h$, or either of them, that the motion given to one of the said shafts may be neutralized upon the frame $e$, substantially as set forth.

C. W. DICKINSON.

Witnesses:
 THOS. P. HOW,
 JAMES T. GRAHAM.